W. B. KNAPP.
Cherry-Pitters.
No. 158,420.
Patented Jan. 5, 1875.
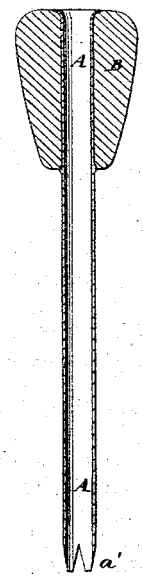
WITNESSES:
INVENTOR:
William B. Knapp
BY
ATTORNEYS.

UNITED STATES PATENT OFFICE.

WILLIAM B. KNAPP, OF TECUMSEH, MICHIGAN, ASSIGNOR TO HIMSELF AND FRANK BUMANN, OF SAME PLACE.

IMPROVEMENT IN CHERRY-PITTERS.

Specification forming part of Letters Patent No. 158,420, dated January 5, 1875; application filed August 15, 1874.

*To all whom it may concern:*

Be it known that I, WILLIAM B. KNAPP, of Tecumseh, in the county of Lenawee and State of Michigan, have invented a new and useful Improvement in Cherry-Pitter, of which the following is a specification:

The figure is a longitudinal section of my improved cherry-pitter.

My invention has for its object to furnish an improved device for removing the pits from cherries, which shall be simple in construction and convenient in use, being so constructed as to remove the pit without the loss of the juice, and without the loss of any of the substance of the cherry, leaving the cherries whole and ready for use.

The invention consists in a cherry-pitter formed of a tube, open at both ends, having a knob or handle placed upon one end, and teeth formed upon its other end, as hereinafter fully described.

A is a tube, open at both ends, and upon one of its ends is secured a knob or handle, B, through which the said tube passes. Upon the other end of the tube A are formed teeth $a'$, which are made sharp and slightly flaring at their points.

In using the pitter, a cherry is pressed against the toothed end of the tube A, which causes the pit to drop through the tube A into a receiver, leaving the cherry whole and ready for use.

Having thus described my invention, I claim as new and desire to secure by Letters Patent—

A cherry-pitter consisting of a tube, A, open at both ends, having a knob or handle, B, placed upon one end, and teeth $a'$ formed upon its other end, substantially as herein shown and described.

WILLIAM B. KNAPP.

Witnesses:
    CHARLES BURRIDGE,
    WILLIAM DE MOTT.